US010228294B2

(12) United States Patent
Bach et al.

(10) Patent No.: US 10,228,294 B2
(45) Date of Patent: Mar. 12, 2019

(54) SYSTEM AND METHOD FOR TEMPERATURE SENSING

(71) Applicant: Infineon Technologies AG, Neubiberg (DE)

(72) Inventors: Elmar Bach, Villach (AT); Patrizia Greco, Villach (AT); Andreas Wiesbauer, Pörtschach (AT); Kwan Siong Kenneth Choong, Singapore (SG); Michael Staber, Villach (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 157 days.

(21) Appl. No.: 15/153,577

(22) Filed: May 12, 2016

(65) Prior Publication Data

US 2017/0328790 A1    Nov. 16, 2017

(51) Int. Cl.
*G06F 19/00* (2018.01)
*G01K 15/00* (2006.01)
*G01K 7/01* (2006.01)

(52) U.S. Cl.
CPC ............ *G01K 15/005* (2013.01); *G01K 7/01* (2013.01); *G01K 15/002* (2013.01)

(58) Field of Classification Search
None
See application file for complete search history.

(56) References Cited

U.S. PATENT DOCUMENTS

| 2010/0141329 A1 | 6/2010 | Kim | |
|---|---|---|---|
| 2013/0259091 A1* | 10/2013 | Chen | G01K 7/34 374/184 |

(Continued)

FOREIGN PATENT DOCUMENTS

| CN | 101019010 A | 8/2007 |
|---|---|---|
| CN | 201680927 U | 12/2010 |
| CN | 104903689 A | 9/2015 |

OTHER PUBLICATIONS

Maderbacher, G., et al., "A Digitally Assisted Single-Point-Calibration CMOS Bandgap Voltage Reference with a 3 Inaccuracy of ±0.08% for Fuel-Gauge Applications," Digest of Technical Papers, ISSCC 2015/Session 5/ Analog Techniques/5.8, 3 pages.

(Continued)

*Primary Examiner* — Edward Raymond
(74) *Attorney, Agent, or Firm* — Slater Matsil, LLP

(57) ABSTRACT

A method includes post processing a plurality of temperature sensors grouped into a plurality of sets. For each set of the plurality of sets, a post-processing system coupled to corresponding temperature sensors receives a plurality output signals generated by the corresponding temperature sensors. For each set of the plurality of sets, the post-processing system computes values representing proportional to absolute temperature (PTAT) voltages and values representing internal reference voltages based on output signals generated by the corresponding temperature sensors. For each set of the plurality of sets, the post-processing system computes an average of the values representing the PTAT voltages and relative PTAT voltage variation coefficients. For each set of the plurality of sets, the post-processing system computes values representing corrected PTAT voltages using the relative PTAT voltage variation coefficients.

34 Claims, 7 Drawing Sheets

(56) References Cited

U.S. PATENT DOCUMENTS

2014/0161149 A1  6/2014  Susak et al.
2015/0117495 A1  4/2015  Tiruvuru et al.

OTHER PUBLICATIONS

Pertijs, M. A. P., et al., "A CMOS Smart Temperature Sensor With a 3? Inaccuracy of ±0.5 Deg. C From −50 Deg. C to 120 Deg. C", IEEE Journal of Solid-State Circuits, vol. 40, No. 2, Feb. 2005, pp. 454-461.

* cited by examiner

SYSTEM AND METHOD FOR TEMPERATURE SENSING

TECHNICAL FIELD

The present disclosure relates generally to a system and method for an electronic device, and, in particular embodiments, to a system and method for temperature sensing.

BACKGROUND

Temperature sensors are commonly used in a variety of applications including thermostats for homes and for industrial use, safety systems, automotive systems, as well as various self-monitoring electronic systems. For example, a temperature sensor may be included on a same die as other electronic circuitry in order to detect increases in ambient temperature. When a high temperature is detected using such a temperature sensor that exceeds a particular limit, the system may take protective action such as shutting down the entire system or portions of the system. Temperature sensors may be further included in integrated circuits, such as a CPU to provide the temperature information for the whole IC for the purpose of thermal management. This information may be used by the integrated circuit to adjust parameters to improve the performance of the circuit over a certain temperature range.

Temperature sensors may be constructed in a variety of ways. For example, a temperature sensor may be constructed using a bi-metallic strip using two metals having different thermal expansion coefficients. The mechanical deflection of such a bi-metallic strip serves as an indication of the temperature of the bi-metallic stip.

Another way to implement a temperature sensor is electronically using solid state circuitry. For example, the junction voltage of a diode, which has an almost linear temperature dependency with a negative slope, may be used to provide a measure of temperature. In another example, a voltage difference between two diodes having two current densities may also be used to measure temperature. A circuit that uses such a voltage difference is commonly referred to as a proportional to absolute temperature (PTAT) generator, and produces an output signal that has linear temperature dependency with a positive slope.

SUMMARY

A method includes post processing a plurality of temperature sensors grouped into a plurality of sets. For each set of the plurality of sets, a post-processing system coupled to corresponding temperature sensors receives a plurality output signals generated by the corresponding temperature sensors. For each set of the plurality of sets, the post-processing system computes values representing proportional to absolute temperature (PTAT) voltages and values representing internal reference voltages based on output signals generated by the corresponding temperature sensors. For each set of the plurality of sets, the post-processing system computes an average of the values representing the PTAT voltages and relative PTAT voltage variation coefficients. For each set of the plurality of sets, the post-processing system computes values representing corrected PTAT voltages using the relative PTAT voltage variation coefficients.

BRIEF DESCRIPTION OF THE DRAWINGS

For a more complete understanding of the present disclosure, and the advantages thereof, reference is now made to the following descriptions taken in conjunction with the accompanying drawings, in which.

Figure 1:
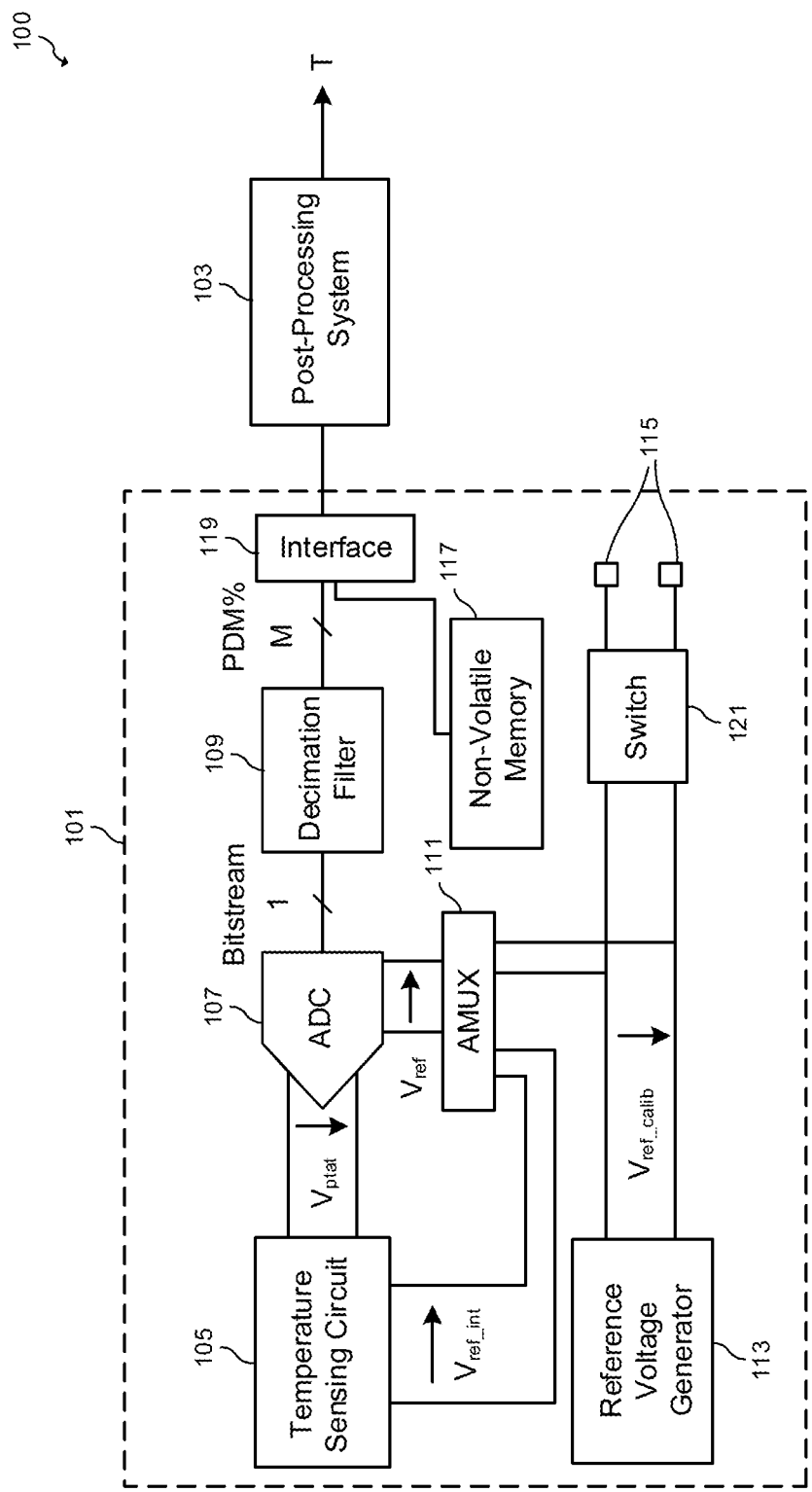
FIG. 1 illustrates a schematic block diagram of an embodiment temperature sensing system.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely a temperature sensing system, and more particularly, a temperature sensing system including a solid state circuitry as a temperature sensing element. Various embodiments described herein include a temperature sensing system including a post-processing system configured to process output signals from a temperature sensing circuit, where the post-processing system may be hardware, software, or a combination thereof. Furthermore, various embodiments described herein further include calibration and temperature sensing methods for a temperature sensing system. Various embodiments of the present disclosure may also be applied to various systems that utilize temperature sensing circuits and other sensing circuits.

In an embodiment, a temperature sensing system utilizes a post-processing system configured to correct for errors due to statistical spread of characteristics of temperature sensing circuits, process corner variations of temperature sensing circuits, and a curvature of a bandgap voltage $V_{bg}$, which may be also referred to as spread, corner and curvature errors, respectively, throughout the following description. In an embodiment, the corner and curvature errors are corrected by adding a linear correction term to an estimated temperature. In an embodiment, the spread error is corrected by averaging responses of multiple temperature sensing circuits.

Conventional temperature sensors may sense a temperature by measuring a PTAT voltage $V_{ptat}$, which is proportional to a voltage difference $\Delta V_{be}$ between voltages across two diodes or two base-emitter junctions of bipolar transistors having different current densities, or a voltage difference $\Delta V_{be}$ between voltages across a single diode or a single base-emitter junction of a bipolar transistor at different current densities. This PTAT voltage $V_{ptat}$ may be compared to a reference voltage such as a bandgap voltage $V_{bg}$. Due to the nonlinear temperature dependency of the diode junction and/or base-emitter voltage $V_{be}$ of the bipolar transistor, the bandgap voltage $V_{bg}$ has a non-linear dependence (curvature) over temperature.

One way to compensate for the spread errors of temperature sensors is to average PTAT voltages $V_{ptat}$ of a plurality of temperature sensors that are formed on a wafer adjacent to each other before dicing the wafer into individual temperature sensors. Based on an average PTAT voltage, correction coefficients are obtained and the PTAT voltages $V_{ptat}$ of the plurality of temperature sensors are corrected. In an embodiment, a statistical spread of the corrected PTAT voltages is reduced compared to uncorrected PTAT voltages.

One way to compensate for the corner errors of the temperature sensors is to compare the voltage across the diode junction or base-emitter voltage $V_{be}(T_{ref})$ at a reference temperature $T_{ref}$ to a target voltage $V_{be\_target}$. Based on a difference between $V_{be}(T_{ref})$ and $V_{be\_target}$, a corner correction coefficient $K_{ptat\_corner}$ is obtained.

One way to compensate for the curvature errors is to shift a center of the bandgap voltage $V_{bg}$ outside a target temperature range of the temperature sensors, such that the bandgap voltage $V_{bg}$ approximately depends on the temperature in a linear manner within the target temperature range. The linear variation of the bandgap voltage $V_{bg}$ is corrected by obtaining a curvature correction coefficient $K_{ptat\_curvature}$. In an embodiment, the corner correction coefficient $K_{ptat\_corner}$ and the curvature correction coefficient $K_{ptat\_curvature}$ are combined into a combined correction coefficient $K_{ptat}$. In an embodiment, the corner and curvature errors introduce linear errors in an estimated temperature. In such embodiment, the combined correction coefficient $K_{ptat}$ is a sum of the corner correction coefficient $K_{ptat\_corner}$ and the curvature correction coefficient $K_{ptat\_curvature}$.

FIG. 1 illustrates a schematic block diagram of an embodiment temperature sensing system 100 including a temperature sensor 101 coupled to a post-processing system 103. The temperature sensor 101 includes a temperature sensing circuit 105 coupled to an analog-to-digital converter (ADC) 107. In an embodiment, the ADC 107 is implemented using a 1-bit sigma-delta modulator. In alternative embodiments, other ADC architectures besides sigma-delta modulator may be also used. The temperature sensor 101 further includes a decimation filter 109 coupled between an output of the ADC 107 and an input of the post-processing system 103. In alterative embodiments, the decimation filter 109 may be omitted or may be included in the post-processing system 103.

In an embodiment, the temperature sensing circuit 105 generates an internal reference voltage $V_{ref\_int}$ and a PTAT voltage $V_{ptat}$. The PTAT voltage $V_{ptat}$ is proportional to an absolute temperature of the temperature sensing circuit 105 and is used as an input by the ADC 107. The internal reference voltage $V_{ref\_int}$ is provided to the ADC 107 through an analog multiplexer (AMUX) 111 as a reference voltage $V_{ref}$. The temperature sensor 101 further includes a reference voltage generator 113, which provides a calibration reference voltage $V_{ref\_calib}$ to the ADC 107 through the AMUX 111 as the reference voltage $V_{ref}$. The reference voltage generator 113 is coupled to a test bus 115 for measuring the calibration reference voltage $V_{ref\_calib}$ while calibrating the temperature sensor 101. In some embodiments, the temperature sensor further includes a switch 121, which is configured to couple or decouple the reference voltage generator 113 from the test bus 115. During a calibration mode, the switch 121 is turned on and the calibration reference voltage $V_{ref\_calib}$ is measured using the test bus 115. During a sensing mode, the switch 121 is turned off and the test bus 115 is decoupled from the rest of the temperature sensor 101.

By including the reference voltage generator 113 in the temperature sensor 101, an accuracy of the calibration reference voltage $V_{ref\_calib}$ may be improved compared an external reference voltage source. Improving the accuracy of the calibration reference voltage $V_{ref\_calib}$ allows for improving an accuracy of the temperature sensor 101. In some embodiments, improved accuracy may be obtained by enabling a high precision measurement of the calibration reference voltage $V_{ref\_calib}$ rather than forcing an external calibration reference voltage to the temperature sensor 101 during calibration. By including the reference voltage generator 113 in the temperature sensor 101, non-idealities such as, for example, cross-talk, noise, series impedances and the like, affecting settling and voltage offsets between internal and external supply domains of the temperature sensor 101, and thus, affecting the accuracy of the calibration reference voltage $V_{ref\_calib}$ during calibration may be reduced or avoided. In an embodiment, a DC measurement of the calibration reference voltage $V_{ref\_calib}$ may be performed while the reference voltage generator 113 is disconnected from the reference voltage input terminal of the ADC 107, allowing the absolute voltage precision of better than about 100 µV. Under the assumption that the ambient temperature does not change significantly during calibration, a large absolute voltage range as well as temperature variations of the internal calibration reference voltage $V_{ref\_calib}$ can be tolerated, as long as the absolute value of the calibration reference voltage $V_{ref\_calib}$ is large enough to avoid an ADC overload while calibrating the temperature sensor 101. In some embodiments, the calibration reference voltage $V_{ref\_calib}$ may vary between about 650 mV and about 750 mV. In some embodiments, the calibration reference voltage $V_{ref\_calib}$ may show a temperature dependency of about ±5% of a median temperature of the target temperature range of the temperature sensor 101.

In an embodiment, the ADC 107 uses the PTAT voltage $V_{ptat}$ and the reference voltage $V_{ref}$ to generate a bitstream having a pulse density X that is related to the input voltage $V_{ptat}$ of the ADC 107. The bitstream represents an input analog signal as a stream of 1-bit data pulses, where the density of 1's represents the input analog value. The pulse density X may be expressed as a ratio of the ADC input voltage $V_{ptat}$ and the ADC reference voltage $V_{ref}$. In the illustrated embodiment, the pulse density X can be expressed by the equation:

$$X = \frac{K_{ADC}V_{ptat}}{V_{ref}}, \tag{1}$$

where $K_{ADC}$ is a gain coefficient of the ADC 107.

The decimation filter 109 is used to decrease the output data rate of the temperature sensor 101 and to output the pulse density X as a pulse density modulation percent (PDM %) encoded in an M-bit 2's complement representation. In some embodiments, the PDM % of the pulse density X may be between about 30% and about 80%. In some embodiments, M may be between 16 and 24. As described below in greater detail, the pulse density X is further processed by the post-processing system 103 to calibrate the temperature sensor 101 and to compute a sensed temperature $T_{sensed}$.

In some embodiments, the temperature sensor 101 may include a non-volatile memory (NVM) 117 coupled to the post-processing system 103. As described below in greater detail, the NVM 117 may be used to store various calibration coefficients and post-processing parameters that are used by the post-processing system 103 to compute the sensed temperature $T_{sensed}$.

In some embodiments, the temperature sensor 101 is coupled to the post-processing system 103 through an interface 119. In an embodiment, the interface 119 may include a suitable digital interface, such as an inter-integrated circuit ($I^2C$) interface, a serial peripheral interface (SPI), a 1-wire digital interface, a supply voltage modulation interface, or the like. Using the interface 119, the post-processing system 103 may steer the temperature sensor 101 into various operating conditions required during calibration and normal operations of the temperature sensor 101. The post-processing system 103 may further use the interface 119 to access calibration data and post-processing parameters stored in the NVM 117, and to receive output data from the temperature sensor 101.

Referring further to FIG. 1, various elements of the temperature sensing system 100 may be formed in an integrated circuit system. For example, the temperature sensor 101 may be formed on a first integrated circuit (IC) die and the post-processing system 103 may be formed on a second IC die, such as an application specific integrated circuit (ASIC) die. In such embodiments, the first IC die and the second IC die may be bonded together, such as through flip-chip bonding, for example. In another example embodiment, the temperature sensor 101 and the post-processing system 103 may be formed on a monolithic IC die.

Figure 2:
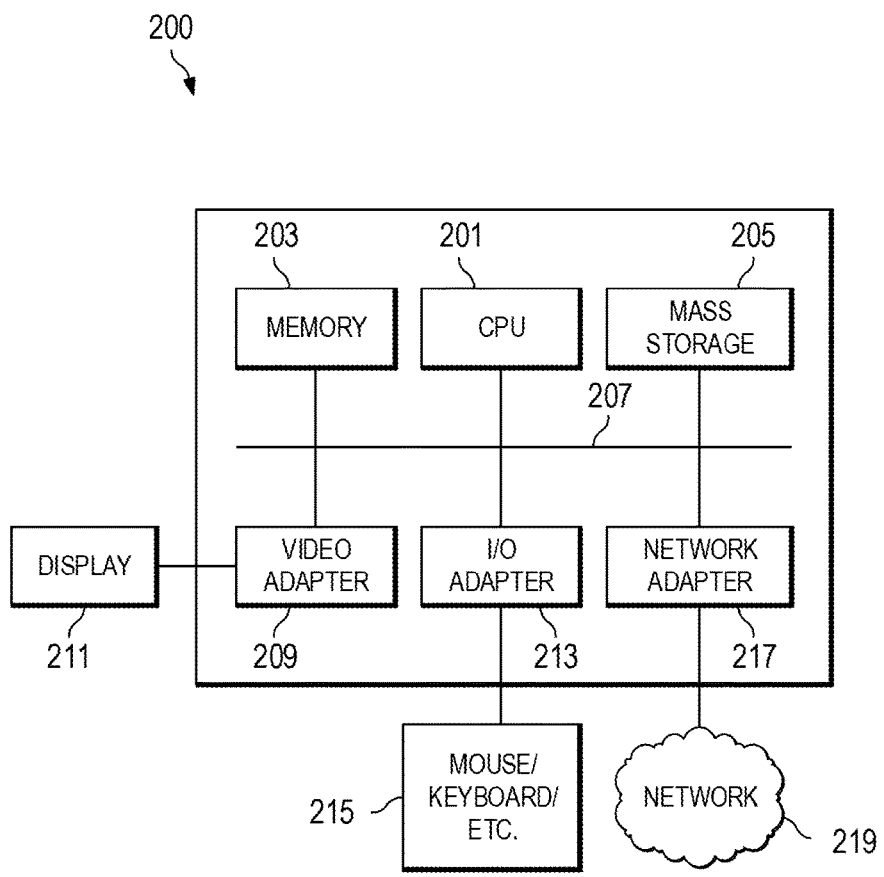
FIG. 2 illustrates a schematic block diagram of an embodiment processing system.

FIG. 2 illustrates a schematic block diagram of an embodiment processing system 200, which may be implemented as the post-processing system 103 of the temperature sensing system 100 illustrated in FIG. 1. The processing system 200 may include, for example, a central processing unit (CPU) 201, a memory 203, and a mass storage device 205 connected to a bus 207 configured to perform the method steps described herein. In some embodiments, the NVM 117 of the temperature sensor 101 (see FIG. 1) may be omitted and the mass storage device 205 may be used to store various calibration coefficients and post-processing parameters that are used by the post-processing system 103 to compute the sensed temperature $T_{sensed}$. The processing system 200 may further include, if desired or needed, a video adapter 209 to provide connectivity to a local display 211 and an input-output (I/O) adapter 213 to provide an input/output interface for one or more input/output devices 215, such as a mouse, a keyboard, printer, tape drive, CD drive, or the like.

The processing system 200 may also include a network interface 217, which may be implemented using a network adapter configured to be coupled to a wired link, such as an Ethernet cable, USB interface, or the like, and/or a wireless/cellular link for communications with a network 219. The network interface 217 may also comprise a suitable receiver and transmitter for wireless communications. It should be noted that the processing system 200 may include other components. For example, the processing system 200 may include power supplies, cables, a motherboard, removable storage media, cases, and the like. These other components, although not shown, are considered part of the processing system 200.

Figure 3:
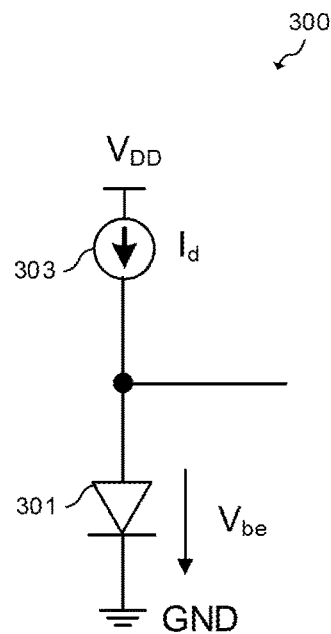
FIGS. 3 and 4 illustrate embodiment temperature sensing circuits.

FIG. 3 illustrates an embodiment temperature sensing circuit 300 that may be implemented as the temperature sensing circuit 105 of the temperature sensor 101 (see FIG. 1). In the illustrated embodiment, the temperature sensing circuit 300 comprises a diode 301 coupled to a current source 303 providing a bias current $I_d$ to the diode 301. In some embodiments, the diode 301 may be implemented using a diode-connected transistor, such as a diode-connected bipolar (PNP or NPN) transistor that may be formed using conventional CMOS processes. The current source 303 applies two different bias currents $I_{d1}$ and $I_{d2}$ to the diode 301 using, for example, the time-interleaved biasing, where $I_{d2}=m \cdot I_{d1}$. In some embodiments, m factor may be between about 4 and about 20. In the illustrated embodiment, a voltage difference $\Delta V_{be}$ between voltages $V_{be2}$ and $V_{be1}$ across the diode 301 at two bias currents $I_{d2}$ and $I_{d1}$, respectively, may be implemented as the PTAT voltage $V_{ptat}$, while the voltage $V_{be1}$ may be implemented as the internal reference voltage $V_{ref\_int}$. In an embodiment in which the internal reference voltage $V_{ref\_int}$ is a base-emitter voltage $V_{be1}$ of a diode-connected bipolar transistor, the internal reference voltage $V_{ref\_int}$ has a negative temperature coefficient of about −2 mV/K, and the PTAT voltage $V_{ptat}$ may be expressed by the equation:

$$V_{ptat} = \Delta V_{be} = \frac{n \cdot k_B \cdot \ln(m)}{q} T = \frac{T}{A_0}, \quad (2)$$

where q is the electron charge, $k_B$ is the Boltzmann constant, m factor is a ratio of biasing currents, n is a coefficient that depends on process corner variations, T is an absolute temperature measured in Kelvins (K), and the coefficient $A_0$ is expressed by the equation:

$$A_0 = \frac{q}{n \cdot k_B \cdot \ln(m)}. \quad (3)$$

Figure 4:
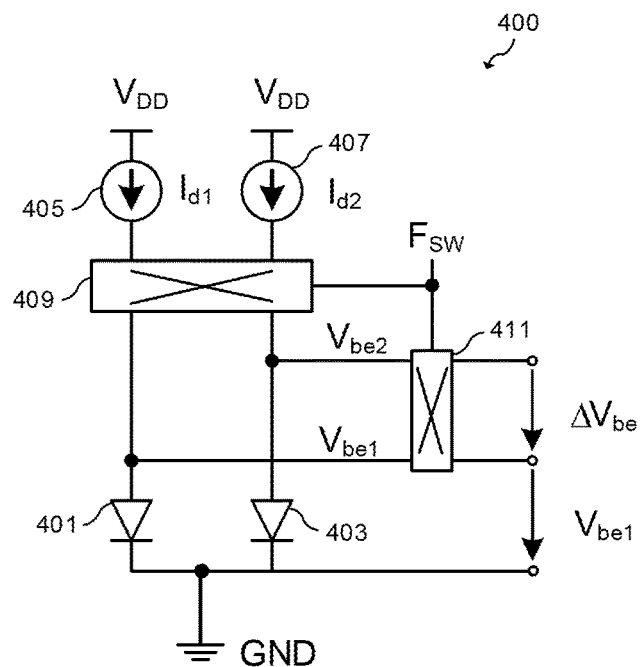

FIG. 4 illustrates an embodiment temperature sensing circuit 400 that may be implemented as the temperature sensing circuit 105 of the temperature sensor 101 (see FIG. 1). The temperature sensing circuit 400 uses two diodes 401 and 403 to generate a voltage difference $\Delta V_{be}$ and the voltage $V_{be1}$ at the same time. In some embodiments, the voltage difference $\Delta V_{be}$ may be implemented as the PTAT voltage $V_{ptat}$, while the voltage $V_{be1}$ may be implemented as the internal reference voltage $V_{ref\_int}$. In other embodiments, a linear combination of the voltage difference $\Delta V_{be}$ and the voltage $V_{be1}$ may be implemented as the internal reference voltage $V_{ref\_int}$. In some embodiments, the diodes 401 and 403 may be implemented using a diode-connected transistor, such as a diode-connected bipolar (PNP or NPN) transistor that may be formed using conventional CMOS processes.

The temperature sensing circuit 400 also includes switching circuits 409 and 411 that are coupled to the diodes 401 and 403. The switching circuits 409 and 411 include multiple switches that are controlled by a clock with a frequency of $F_{SW}$. In some embodiments, the sampling frequency $F_{SW}$ may be synchronized with the clock of the ADC (such as the ADC 107 illustrated in FIG. 1). The switching circuit 409 allows a dynamic element matching (DEM) of the current sources 405 and 407 connected to the diodes 401 and 403, respectively. The switching circuit 409 allows for dynamically interchanging the currents $I_{d1}$ and $I_{d2}$ biasing the diodes 401 and 403 to eliminate mismatch of the current sources 405 and 407. Similarly, the switching circuit 411 is used to dynamically interchange the connections of the anodes of the diodes 401 and 403 to generate voltages $\Delta V_{be}$ and $V_{be1}$. By using DEM the voltages $\Delta V_{be}$ and $V_{be1}$ are averaged across two diodes 401 and 403, and an error due to mismatch is reduced. In an embodiment, the switching circuits 409 and 411 may be implemented as part of a correlated double sampling (CDS) scheme of the ADC. In alternative embodiments, the switching circuits 409 and 411 may be implemented using any other offset cancelling circuits.

Figure 5:
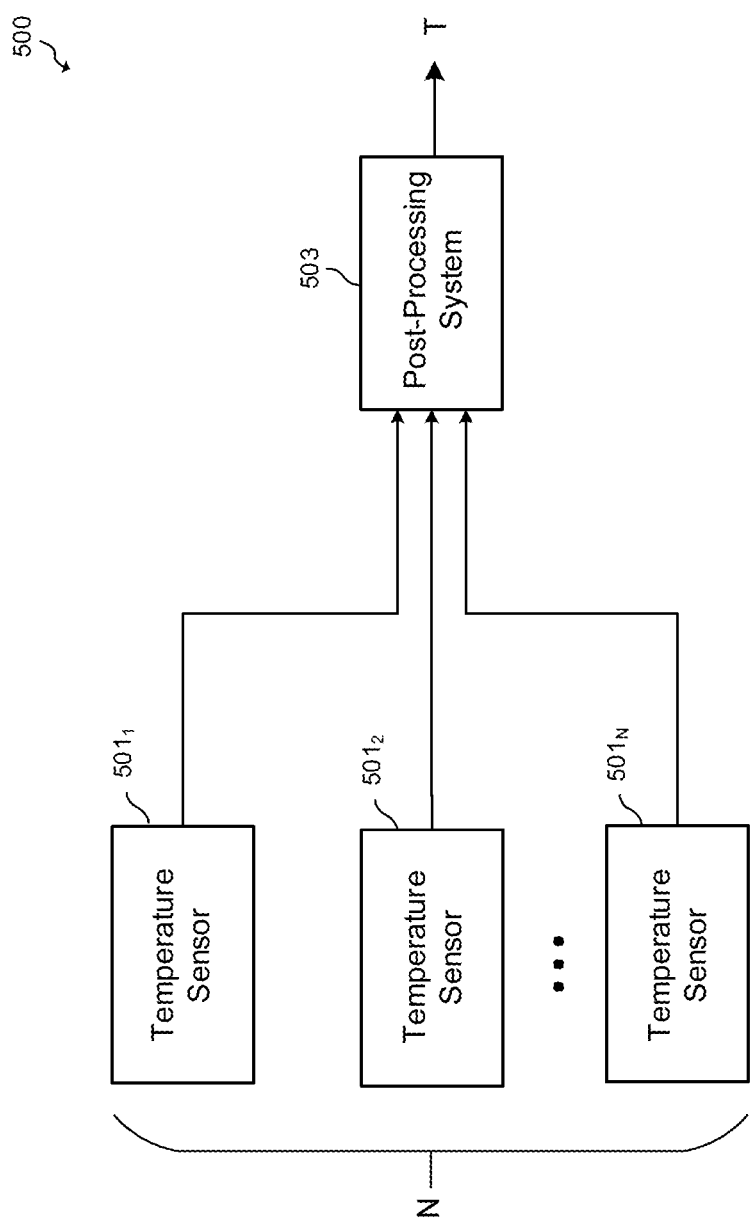
FIG. 5 illustrates a schematic block diagram of an embodiment temperature sensing system.

In some embodiments, temperature sensors (such as the temperature sensor 101 illustrated in FIG. 1) may be formed on a wafer and may be calibrated before dicing the wafer into individual temperature sensors. In such embodiments, the temperature sensors may be grouped into a plurality of sets, for example, according to proximity to each other on the wafer. As described below in greater detail, output signals of the temperature sensors in each set are averaged to calibrate the temperature sensors. Such a set of the temperature sensors is illustrated in FIG. 5, where a plurality of the temperature sensors $501_1$ to $501_N$ in the set are coupled to a post-processing system 503. In some embodiments, the temperature sensors $501_1$ to $501_N$ may have a similar structure as the temperature sensor 101 illustrated in FIG. 1, the post-processing system 503 may be similar to the processing system 200 illustrated in FIG. 2, and the descriptions are not repeated herein for the sake of brevity. In the illustrated embodiments, output signals of the temperature sensors $501_1$ to $501_N$ that are provided to the post-processing system 503 are used to calibrate the temperature sensors $501_1$ to $501_N$. In some embodiments, the number of temperature sensors in each set N may be between 8 and 128. In some embodiments, a parallel wafer test may be used to obtain calibration data of the temperature sensors $501_1$ to $501_N$ accessible at a single touch-down prior to proceeding to the next set of temperature sensors. Calibration coefficients of the individual temperature sensors $501_1$ to $501_N$ are computed by the processing system 503 and are stored in the NVM's (such as the NVM 117 illustrated in FIG. 1) of the corresponding temperature sensors $501_1$ to $501_N$ while the wafer test system is in electrical contact with the temperature sensors $501_1$ to $501_N$. In some embodiments, the wafer test system contacts all sets of temperature sensors on the wafer and in a single sweep all temperature sensors on the wafer are calibrated, corresponding calibration coefficients are computed and are stored in corresponding NVM's.

Figure 6:
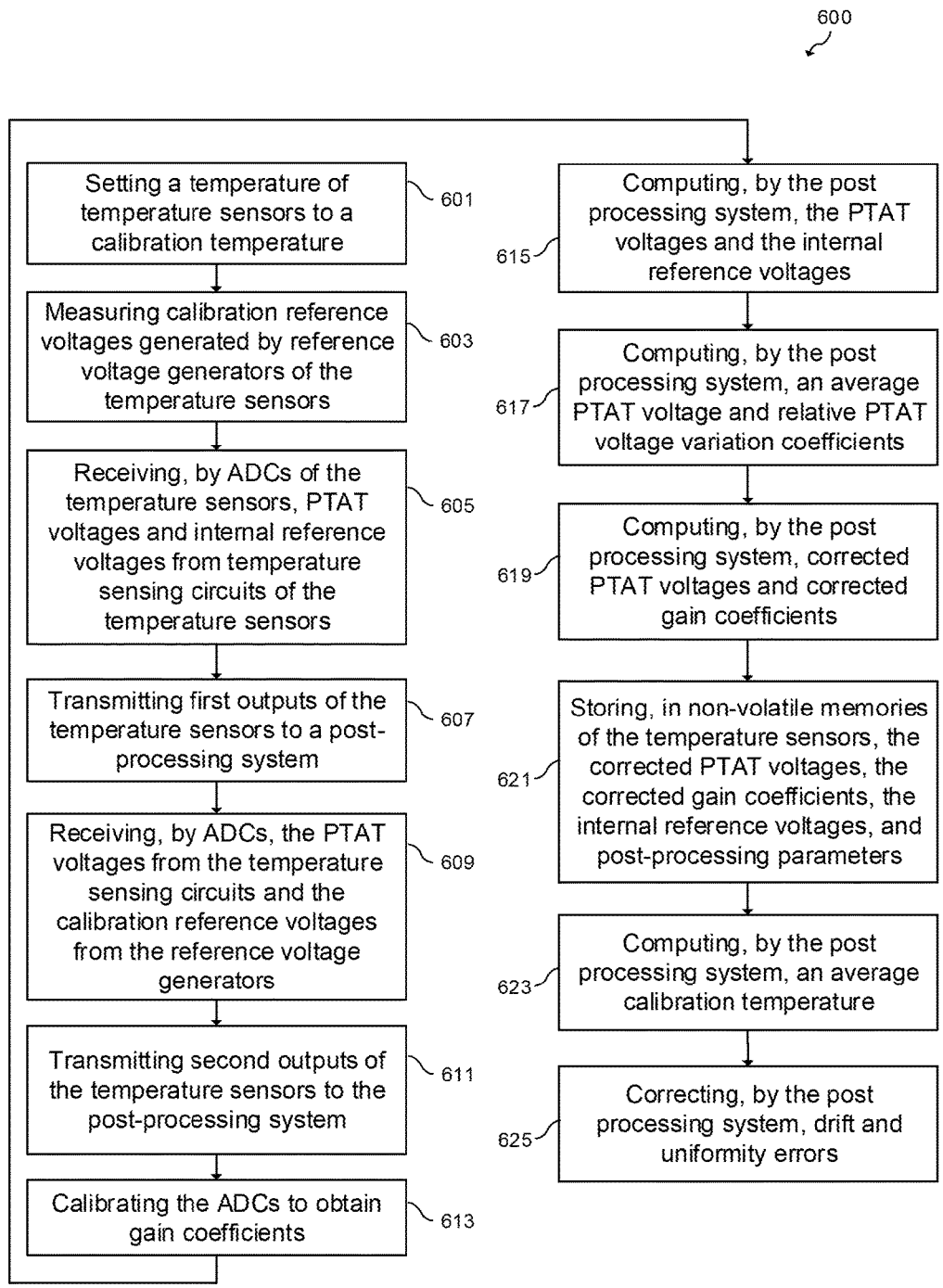
FIG. 6 illustrates a flowchart diagram of an embodiment calibration method.

FIG. 6 illustrates a flowchart diagram of an embodiment calibration method 600. The method 600 starts with step 601, when a temperature for a wafer including a plurality of temperature sensors is set to a calibration temperature $T_{calib}$, using a thermal chuck, for example. In some embodiments, the calibration temperature $T_{calib}$ may be chosen to equal a median temperature of the target temperature range of the temperature sensors. For example, in an embodiment with the target temperature range of between about −40° C. and about 100° C., the calibration temperature $T_{calib}$ may be set to about 25° C. In step 603, a calibration reference voltage $V_{ref\_calib}$ provided by a reference voltage generator (such as the reference voltage generator 113 illustrated in FIG. 1) of each temperature sensor in a set of the temperature sensors (such as the temperature sensors $501_1$ to $501_N$ illustrated in FIG. 5) is measured. In some embodiments, measurement is performed on the set of temperature sensors in parallel, for example, using a probe card with a plurality of pins. In step 605, an ADC (such as the ADC 107 illustrated in FIG. 1) of each temperature sensor in the set of the temperature sensors receives a PTAT voltage $V_{ptat}$ and an internal reference voltage $V_{ref\_int}$ from a corresponding temperature sensing circuit (such as the temperature sensing circuits 300 and 400 illustrated in FIGS. 3 and 4, respectively). In an embodiment in which the temperature sensing circuits include diode-connected bipolar transistors, the PTAT voltage $V_{ptat}$ equals to the voltage difference $\Delta V_{be}$ and the internal reference voltage $V_{ref\_int}$ equals to the voltage $V_{be1}$ at the low bias current $I_{d1}$. In alternative embodiments, the internal reference voltage $V_{ref\_int}$ equals to the voltage $V_{be2}$ at the high bias current $I_{d2}$. In step 607, each temperature sensor generates a pulse density $X_1$, where the pulse density $X_1$ may be expressed by the equation:

$$X_1 = \frac{K_{ADC} V_{ptat}}{V_{ref\_int}} = \frac{K_{ADC} \Delta V_{be\_calib}}{V_{be1\_calib}}, \quad (4)$$

where a subscript "calib" denotes that the PTAT voltage $\Delta V_{be\_calib}$ and the internal reference voltage $V_{be1\_calib}$ are generated at calibration. The pulse density $X_1$ is provided to a post-processing system (such as the post-processing systems 503 illustrated in FIG. 5) for further processing.

In step 609, the ADC of each temperature sensor in the set of the temperature sensors receives the PTAT voltage $V_{ptat}$ from a corresponding temperature sensing circuit and a calibration reference voltage $V_{ref\_calib}$ from a corresponding reference voltage source (such as the reference voltage generator 113 illustrated in FIG. 1) coupled to the ADC. In step 611, each temperature sensor generates a pulse density $X_2$, where the pulse density $X_2$ may be expressed by the equation:

$$X_2 = \frac{K_{ADC} V_{ptat}}{V_{ref\_calib}} = \frac{K_{ADC} \Delta V_{be\_calib}}{V_{ref\_calib}}. \quad (5)$$

The pulse density $X_2$ is provided to the post-processing system for further processing.

In step 613, each ADC is calibrated to obtain a corresponding gain coefficient $K_{ADC}$. In some embodiments, input and reference voltages of each ADC may be matched, such that an output of each ADC is equal to a corresponding $K_{ADC}$. In other embodiments, alternative calibration methods may be also used to calibrate the ADCs of the temperature sensors. Such a calibration method has been described in U.S. application Ser. No. 15/098,988, filed on Apr. 14, 2016, which application is hereby incorporated herein by reference in its entirety. In step 615, for each temperature sensor, the post-processing system computes the PTAT voltage $\Delta V_{be\_calib}$ and the internal reference voltage $V_{be1\_calib}$ using the pulse densities $X_1$ and $X_2$ (see Eqs. 4 and 5). In some embodiments, the PTAT voltage $\Delta V_{be\_calib}$ may be determined using Eq. 5, and the internal reference voltage $V_{be1\_calib}$ may be determined by the equation:

$$V_{be1\_calib} = \frac{X_2}{X_1} V_{ref\_calib}. \quad (6)$$

In step 617, the post-processing system computes an average PTAT voltage $\Delta V_{be\_avg}$ for the set of temperature sensors. By averaging the PTAT voltages of the temperature sensors, the spread error of the PTAT voltages may be reduced. Furthermore, for each temperature sensor, the post-processing system computes a relative voltage variation coefficient $K_{\Delta V_{be}}$, which may be expressed by the equation:

$$K_{\Delta V_{be}} = \frac{\Delta V_{be\_calib}}{\Delta V_{be\_avg}}. \qquad (7)$$

In step 619, for each temperature sensor, the post-processing system computes a corrected PTAT voltage $\Delta V_{be\_corr\_calib}$ and a corrected gain coefficient $K_{ADC\_corr}$. The corrected PTAT voltage $\Delta V_{be\_corr\_calib}$ may be expressed by the equation:

$$\Delta V_{be\_corr\_calib} = \frac{\Delta V_{be\_calib}}{K_{\Delta V_{be}}} = \Delta V_{be\_avg}. \qquad (8)$$

By setting the corrected PTAT voltage $\Delta V_{be\_corr\_calib}$ for each temperature sensor to the average PTAT voltage $\Delta V_{be\_avg}$, it is ensured that all temperature sensors in the set sense the same calibration temperature $T_{calib}$. The corrected gain coefficient $K_{ADC\_corr}$ may be expressed by the equation:

$$K_{ADC\_corr} = K_{ADC} \cdot K_{\Delta V_{be}}. \qquad (9)$$

In step 621, for each temperature sensor, the device specific calibration coefficients such as the corrected PTAT voltage $\Delta V_{be\_corr\_calib}$, the corrected gain coefficient $K_{ADC\_corr}$, and the internal reference voltage $V_{be1\_calib}$, and post-processing parameters such as factors n and m are stored in a non-volatile memory (such as the NVM 117 illustrated in FIG. 1) of a corresponding temperature sensor. In alternative embodiments, the device specific calibration coefficients of each temperature sensor and the post-processing parameters are stored in a mass storage device (such as the mass storage device 205 illustrated in FIG. 2) of the post-processing system. In an embodiment, offsets of the corrected PTAT voltages $\Delta V_{be\_corr\_calib}$, the corrected gain coefficients $K_{ADC\_corr}$, and the internal reference voltages $V_{be1\_calib}$ with respect to corresponding target values are stored to reduce the required storage space. As described below in greater detail, the device specific calibration coefficients and the constant $A_0$ (see Eq. 3) enable computation of the calibration temperature $T_{calib}$ (see Eqs. 2 and 5), and the corrected bandgap voltage $V_{bg\_corr\_calib}$ at the calibration temperature $T_{calib}$, which is used as the device specific reference voltage by further post-processing steps. The corrected bandgap voltage $V_{bg\_corr\_calib}$ at the calibration temperature $T_{calib}$ is expressed using the equation:

$$V_{bg\_corr\_calib} = V_{be1\_calib} + \alpha \cdot \Delta V_{be\_corr\_calib}, \qquad (10)$$

In some embodiments, the coefficient $\alpha$ may be chosen such that the bandgap voltage $V_{bg}$ is approximately temperature independent within the target temperature range of the temperature sensors. In some embodiments, the coefficient $\alpha$ may be chosen to be between about 9 and about 12. In some embodiments, in step 621, the coefficient $\alpha$ may be also stored in the NVM of the corresponding temperature sensor or the mass storage device of the post-processing system as one of the post-processing parameters.

In step 623, the post-processing system computes an average calibration temperature $T_{calib\_avg}$ for the set of temperature sensors. In some embodiments, the average calibration temperature $T_{calib\_avg}$ is computed using Eqs. 2 and 8. Subsequently, the post-processing system repeats steps 603 through 623 for the each remaining set of temperature sensors on the wafer and, for each set of temperature sensors, calculates a corresponding average calibration temperature $T_{calib\_avg}$. In some embodiments, due to process corner and statistical variations, the average calibration temperatures have a spread characterized by a distribution, such that some of the average calibration temperatures may be outside a desired error margin. By averaging the PTAT voltages as described above with respect to step 617, the distribution of the average calibration temperatures is narrowed compared to a distribution of the calibration temperatures before averaging. In some embodiments, outlier temperature sensors, the average calibration temperatures of which are outside the desired error margin, may be discarded or may be used in applications that do not require high precision sensing capabilities.

In some embodiments, the thermal chuck may adversely affect the distribution of the average calibration temperatures by widening the distribution and increasing a number of outlier temperature sensors. In some embodiment, an average temperature of the thermal chuck may drift from wafer to wafer, and may have an absolute temperature error between about −3° C. and about 3° C. In addition to the average temperature drift, the thermal chuck may suffer a uniformity error. Due to positioning of cooling/heating elements below the thermal chuck, the temperature across a wafer that is placed on the thermal chuck is non-uniform. In some embodiments, the uniformity error may be characterized by a characteristic function $f(x,y)$, which is equal to $T(x,y)-T_{avg}$, where x and y are coordinates across the wafer, $T(x,y)$ is a temperature of the wafer at a location having the coordinates x and y, and $T_{avg}$ is an average temperature of the entire wafer or a part of the wafer that is known to have a temperature closest to the target temperature. In some embodiments, the part of the wafer may be a central region of the wafer. In other embodiments, the part of the wafer may be other regions of the wafer depending on properties of the thermal chuck used during calibration.

In some embodiments, the characteristic function $f(x,y)$ may be determined by measuring a temperature of the wafer $T(x,y)$ before preforming calibration of temperature sensors. In some embodiments, the measured characteristic function $f(x,y)$ may be fitted to a polynomial function and may be stored in the mass storage device of the post-processing system as one of the post-processing parameters.

In step 625, the post-processing system uses the average temperature $T_{avg}$ to correct for the average temperature drift of the thermal chuck and uses the characteristic function $f(x,y)$ to correct for the uniformity error of the thermal chuck. To correct for the average temperature drift of the thermal chuck, the post-processing system centers the distribution of the calibration temperatures by shifting the average temperature of the distribution to zero. In some embodiments, the centered calibration temperature $T_{calib\_centered}(x,y)$ of a temperature sensor at a location having the coordinates x and y is computed by the following equation:

$$T_{calib\_centered}(x,y) = T_{calib}(x,y) - T_{avg}. \qquad (11)$$

To correct for the uniformity error of the thermal chuck, the post-processing system uses the characteristic function $f(x,y)$ to compute a corrected centered calibration temperature $T_{calib\_centered\_corr}$ for each temperature sensor. In some embodiments, the corrected centered calibration temperature $T_{calib\_centered\_corr}(x,y)$ of a temperature sensor at a location having the coordinates x and y is computed by the following equation:

$$T_{calib\_centered\_corr}(x,y) = T_{calib\_centered}(x,y) - f(x,y). \qquad (12)$$

In some embodiments, by correcting the drift and uniformity errors, the distribution of the calibration temperatures may be further narrowed, such that fewer temperatures readouts may be outside the desired error margin. Accordingly, fewer outlier temperature sensors may be discarded, which increases the yield of high precision temperature sensors.

Figure 7:
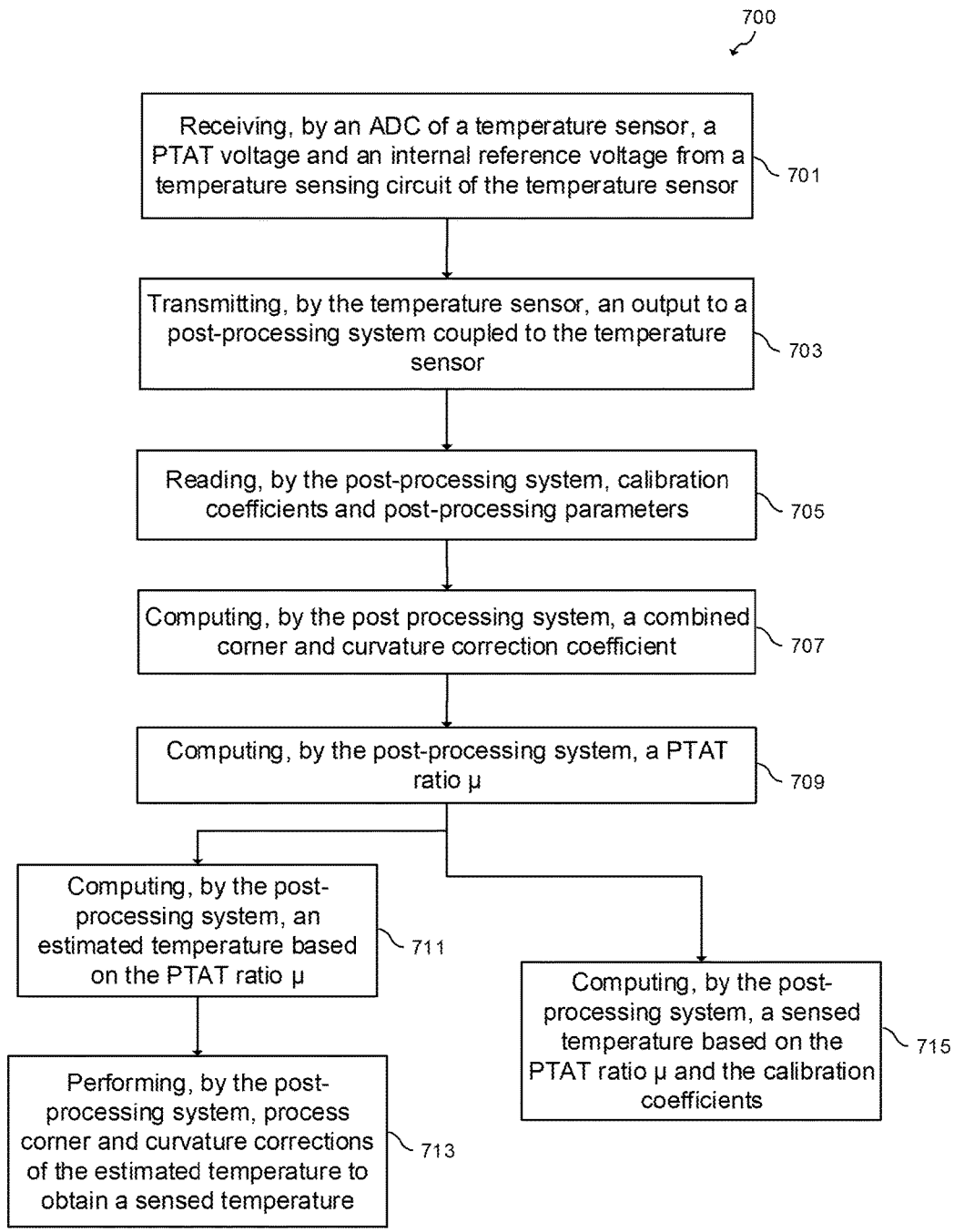
FIG. 7 illustrates a flowchart diagram of an embodiment temperature sensing method.

FIG. 7 illustrates a flowchart diagram of an embodiment temperature sensing method 700. The method 700 starts with step 701, wherein an ADC (such as the ADC 107 illustrated in FIG. 1) of a temperature sensor (such as the temperature sensor 101 illustrated in FIG. 1) receives a PTAT voltage $V_{ptat}$ and an internal reference voltage $V_{ref\_int}$ from a temperature sensing circuit (such as the temperature sensing circuits 300 and 400 illustrated in FIGS. 3 and 4, respectively). In an embodiment in which the temperature sensing circuit includes a diode-connected bipolar transistor, the PTAT voltage $V_{ptat}$ equals to the voltage difference $\Delta V_{be}$ and the internal reference voltage $V_{ref\_int}$ equals to the voltage $V_{be1}$. In step 703, the temperature sensor generates a pulse density X, where the pulse density X may be expressed by the equation:

$$X = \frac{K_{ADC}\Delta V_{be}}{V_{be1}}. \tag{13}$$

The pulse density X is provided to a post-processing system (such as the post-processing system 103 illustrated in FIG. 1) for further processing. In step 705, the post-processing system reads device specific calibration coefficients and the post-processing parameters stored in a non-volatile memory (such as the NVM 117 illustrated in FIG. 1) of the temperature sensor. In alternative embodiments, the post-processing system reads the device specific calibration coefficients and the post-processing parameters stored in a mass storage device (such as the mass storage device 205 illustrated in FIG. 2) of the post-processing system. In some embodiments, the device specific calibration coefficients may be determined using a method similar to the method 600 illustrated in FIG. 6 and the description is not repeated herein. In an embodiment, the device specific calibration coefficients include the corrected gain coefficient $K_{ADC\_corr}$, the corrected PTAT voltage $\Delta V_{be\_corr\_calib}$ and the internal reference voltage $V_{be1\_calib}$, all measured at the calibration temperature $T_{calib}$. The post-processing parameters include factors n, m and a, the target reference voltage $V_{be\_target}$, and the coefficients $K_{ptat\_corner\_max}$ and $K_{ptat\_curvature}$. As described below in greater detail, the post-processing system uses the target reference voltage $V_{be\_target}$ and the coefficient $K_{ptat\_corner\_max}$ to compute corner correction coefficients $K_{ptat\_corner}$.

In step 707, the post-processing system computes a correction coefficient $K_{ptat}$ to correct for corner and curvature errors. In an embodiment, the post-processing system computes the internal reference voltage $V_{be1}$ at a reference temperature $T_{ref}$, which is different from the calibration temperature $T_{calib}$. In some embodiments, the reference temperature $T_{ref}$ may be about 25° C. The internal reference voltage $V_{be1}$ at the reference temperature $T_{ref}$ may be expressed using the equation:

$$V_{be1}(T_{ref}) = V_{be1\_calib} - (T_{calib} - T_{ref}) \cdot KV_{be1}, \tag{14}$$

where the coefficient $KV_{be1}$ is equal to about −2 mV/K, and where the calibration temperature $T_{calib}$ is computed by the post-processing system based on Eqs. 2 and 5. The post-processing system compares the internal reference voltage $V_{be1}$ at the reference temperature $T_{ref}$ to a target reference voltage $V_{be\_target}$ to determine a shift due to the corner errors. In some embodiments, the target reference voltage $V_{be\_target}$ may be determined by simulating the temperature sensors at the reference temperature $T_{ref}$. Subsequently, for each temperature sensor, the post-processing system computes a corner correction coefficient $K_{ptat\_corner}$ to counteract the shift due to the corner errors. The corner correction coefficient $K_{ptat\_corner}$ may be expressed by the equation:

$$K_{ptat\_corner} = K_{ptat\_corner\_max} \cdot (V_{be\_target} - V_{be1}(T_{ref})). \tag{15}$$

where the coefficient $K_{ptat\_corner\_max}$ is determined simulating the temperature sensor 101 and is adjusted based on empirical data obtained from measurements of the temperature sensor 101.

In addition, the post-processing system uses a curvature correction coefficient $K_{ptat\_curvature}$ to minimize the curvature errors. In an embodiment, to correct for the curvature of the bandgap voltage $V_{bg\_corr}$, the coefficient α may be chosen such that the bandgap voltage $V_{bg\_corr}$ depends on the temperature in an approximately linear manner within the target temperature range of the temperature sensors. The curvature correction coefficient $K_{ptat\_curvature}$ is used to counteract the resulting error, which is approximately a linear error within the target temperature range of the temperature sensor. In the illustrated embodiment, the corner and curvature errors result in approximately linear errors in the sensed temperature $T_{sensed}$. Accordingly, the corner correction coefficient $K_{ptat\_corner}$ and the curvature correction coefficient $K_{ptat\_curvature}$ may be combined into a combined correction coefficient $K_{ptat}$, which may be expressed by the equation:

$$K_{ptat} = K_{ptat\_corner} + K_{ptat\_curvature}. \tag{16}$$

In alternative embodiments, the correction coefficient $K_{ptat}$ may be determined during a calibration mode of the temperature senor and the correction coefficient $K_{ptat}$ may be stored in the NVM of the temperature sensor along with the device specific calibration coefficients and the post-processing parameters. In such embodiments, the post-processing system may read the correction coefficient $K_{ptat}$ stored in the NVM of the temperature sensor in step 705.

In step 709, the post-processing system computes a PTAT ratio μ, which may be expressed by the equation:

$$\mu = \frac{X}{1 + \frac{\alpha}{K_{ADC\_corr}}X} = \frac{K_{ADC} \cdot \Delta V_{be}}{V_{bg\_corr}}, \tag{17}$$

where the bandgap voltage $V_{bg\_corr}$ is expressed using the equation:

$$V_{bg\_corr} = V_{be1} + \alpha \cdot \Delta V_{be\_corr} = V_{be1} + \alpha \cdot \frac{\Delta V_{be}}{K_{\Delta V_{be}}}, \tag{18}$$

and where the coefficient α may be chosen to be between about 9 and about 12.

In step 711, the post-processing system computes an estimated temperature $T_{est}$ from the PTAT ratio μ. The estimated temperature $T_{est}$ may be expressed by the equation:

$$T_{est} = A \cdot \mu + B, \tag{19}$$

where the coefficient A is expressed by the equation:

$$A = A_0 \frac{V_{bg\_corr\_calib}}{K_{ADC\_corr}}, \quad (20)$$

and where the corrected bandgap voltage $V_{bg\_corr\_calib}$ at the calibration temperature $T_{calib}$ is expressed by Eq. 10, the coefficient $A_0$ is expressed by Eq. 3, and the coefficient B is equal to −273.15K. In some embodiments, the coefficient B may be altered from this value to correct for a temperature offset, for example, caused by self-heating of the temperature sensor inside of a packaged device. Since the corrected bandgap voltage $V_{bg\_corr\_calib}$ at the calibration temperature $T_{calib}$ does not equal to the corrected bandgap voltage $V_{bg\_corr}$ at the sensed temperature $T_{sensed}$, the estimated temperature $T_{est}$ does not equal to the sensed temperature $T_{sensed}$.

In step 713, the post-processing system corrects the estimated temperature $T_{est}$ to obtain the sensed temperature $T_{sensed}$. In an embodiment, the post-processing system uses the correction coefficient $K_{ptat}$ to correct for the corner and curvature errors. The sensed temperature $T_{sensed}$ may be expressed by the equation:

$$T_{sensed} = T_{est} + (T_{est} - T_{calib}) \cdot K_{ptat} \quad (21)$$

In alternative embodiments, instead of steps 711 and 713, step 715 may be performed, where the corner and curvature errors are corrected in combination with mapping from the PTAT ratio μ to the temperature domain. In such embodiments, the post-processing system uses the correction coefficient $K_{ptat}$ to correct the coefficients A and B and to compute corrected coefficients A' and B'. Using the corrected coefficients A' and B', the sensed temperature $T_{sensed}$ may be expressed by the equation:

$$T_{sensed} = A' \cdot \mu + B'. \quad (22)$$

where the corrected coefficient A' is expressed by the equation:

$$A' = A \cdot (1 + K_{ptat}), \quad (23)$$

and where the corrected coefficient B' is expressed by the equation:

$$B' = B \cdot (1 + K_{ptat}) - K_{ptat} \cdot T_{calib}. \quad (24)$$

In some embodiments, the sensed temperature $T_{sensed}$ may have an absolute error between about −0.4° C. and about +0.4° C. In alternative embodiments, the corrected coefficients A' and B' may be determined during the calibration mode of the temperature senor and the corrected coefficients A' and B', and a coefficient $\alpha' = \alpha/K_{ADC\_corr}$ may be stored in the NVM of the temperature sensor instead of the device specific calibration coefficients (such as the corrected gain coefficient $K_{ADC\_corr}$, the corrected PTAT voltage $\Delta V_{be\_corr\_calib}$, the internal reference voltage $V_{be1\_calib}$, and the correction coefficient $K_{ptat}$) and post-processing parameters (such as the factors n, m and α, the target reference voltage $V_{be\_target}$, and the coefficient $K_{ptat\_corner\_max}$). In such embodiments, the post-processing system may read the corrected coefficients A' and B', and the coefficient $\alpha' = \alpha/K_{ADC\_corr}$ stored in the NVM of the temperature sensor in step 705.

In alternative embodiments, some or all post-processing steps described above may be implemented using hardware components of the temperature sensor. For example, in some embodiments in which the ADC of the temperature sensor outputs a pulse density equal to the PTAT ratio $\mu = \Delta V_{be}/V_{bg}$ directly, the corrected coefficient A' may be combined with gain setting coefficients of a decimation filter (such as the decimation filter 109 illustrated in FIG. 1). In addition, the temperature sensor may further include an adder unit (not illustrated) coupled to the decimation filter. The adder unit may be configured to add the corrected coefficient B' to an output of the decimation filter.

Figure 8:
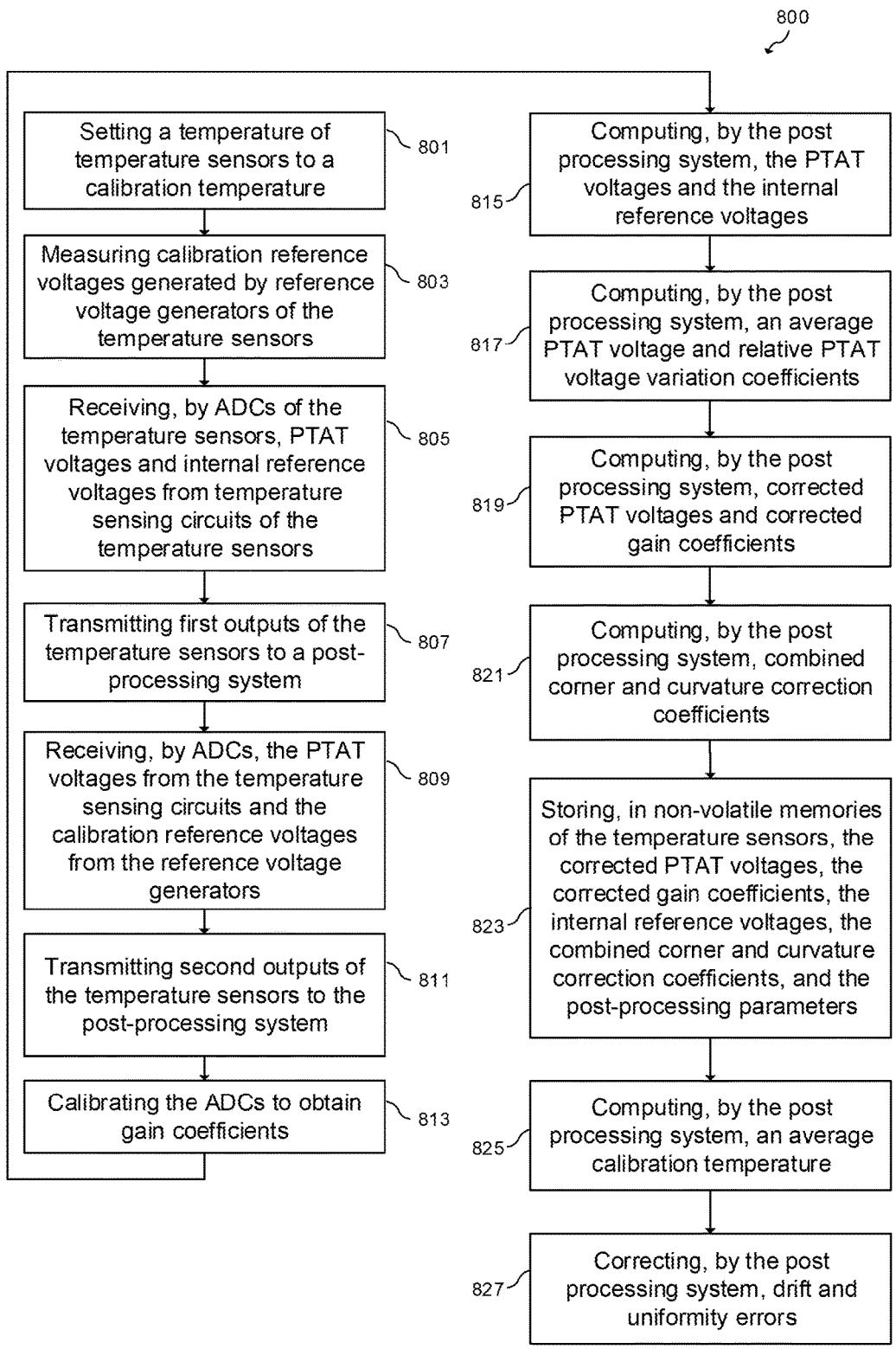
FIG. 8 illustrates a flowchart diagram of an embodiment calibration method.

Referring further to FIG. 7, in the illustrated embodiment, the correction coefficient $K_{ptat}$ is computed during a sensing mode of a temperature sensor. In alternative embodiments, the correction coefficient $K_{ptat}$ may be computed during a calibration mode of a temperature sensor and may be stored in a NVM of the temperature sensor along with the device specific calibration coefficients and the post-processing parameters. FIG. 8 illustrates a flowchart diagram of such an embodiment calibration method 800. In some embodiments, steps 801, 803, 805, 807, 809, 811, 813, 815, 817, 819, 825 and 827 of the method 800 are similar to steps 601, 603, 605, 607, 609, 611, 613, 615, 617, 619, 623 and 625 of the method 600 (see FIG. 6), respectively, and the description is not repeated for the sake of brevity. In step 821, for each temperature sensor, a corner correction coefficient $K_{ptat\_corner}$, a curvature correction coefficient $K_{ptat\_curvature}$, and a combined correction coefficient $K_{ptat}$ is computed by the post-processing system. In some embodiments, step 821 of the method 800 may be similar to step 707 of the method 700 (see FIG. 7) and the description is not repeated for the sake of brevity. In step 823, for each temperature sensor, the device specific calibration coefficients such as the corrected PTAT voltage $\Delta V_{be\_corr\_claib}$, the corrected gain coefficient $K_{ADC\_corr}$, the internal reference voltage $V_{be1\_calib}$, the correction coefficient $K_{ptat}$, and the post-processing parameters such as factors n, m and a, the target reference voltage $V_{be\_target}$, and the coefficient $K_{ptat\_corner\_max}$ are stored in a non-volatile memory (such as the NVM 117 illustrated in FIG. 1) of a corresponding temperature sensor. In alternative embodiments, the device specific calibration coefficients, the correction coefficient $K_{ptat}$ of each temperature sensor, and the post-processing parameters are stored in a mass storage device (such as the mass storage device 205 illustrated in FIG. 2) of the post-processing system. In alternative embodiments, the corrected coefficients A' and B' (see Eqs. 23 and 24), and the coefficient $\alpha' = \alpha/K_{ADC\_corr}$ may be computed during the calibration mode and may be stored in the NVM of the temperature sensor instead of the device specific calibration coefficients (such as the corrected gain coefficient $K_{ADC\_corr}$, the corrected PTAT voltage $\Delta V_{be\_corr\_calib}$ the internal reference voltage $V_{be1\_calib}$ and the correction coefficient $K_{ptat}$) and post-processing parameters (such as the factors n, m and a, the target reference voltage $V_{be\_target}$, and the coefficient $K_{ptat\_corner\_max}$). In such embodiments, in step 821, the post-processing system computes the corrected coefficients A' and B', and the coefficient $\alpha' = \alpha/K_{ADC\_corr}$ using Eqs. 23 and 24.

Referring Further to FIG. 8, in alternative embodiments, in step 827, the post-processing system corrects for the average temperature drift and the uniformity error of the thermal chuck after the corner and/or curvature errors have been corrected and the sensed temperatures $T_{sensed}$ have been computed. In such embodiments, the post-processing system uses the average temperature $T_{avg}$ and the characteristic function $f(x,y)$ to compute a corrected centered sensed temperature $T_{sensed\_centered\_corr}$. In some embodiments, the corrected centered sensed temperature $T_{sensed\_centered\_corr}(x,y)$ of a temperature sensor at a location having the coordinates x and y is computed by the following equation:

$$T_{sensed\_centered\_corr}(x,y) = T_{sensed}(x,y) - T_{avg} - f(x,y). \quad (25)$$

Referring further to FIGS. 6, 7 and 8, the methods 600, 700 and 800 are described with respect to embodiments, where the PTAT voltage $V_{ptat}$ equals to $\Delta V_{be}$ and the internal reference voltage $V_{ref\_int}$ equals to $V_{be1}$. Methods similar to the methods 600, 700 and 800 may be also applied to alternative embodiments, where the PTAT voltage $V_{ptat}$ equals to $\Delta V_{be}$, the internal reference voltage $V_{ref\_int}$ equals to $V_{be1}$, and ADCs of temperature sensors are configured to output a pulse density equal to $\Delta V_{be}/V_{bg}$. Methods similar to the methods 600, 700 and 800 may be further applied to alternative embodiments, where the PTAT voltage $V_{ptat}$ equals to $\Delta V_{be}$ and the internal reference voltage $V_{ref\_int}$ equals to the bandgap voltage $V_{bg}$. Methods similar to the methods 600, 700 and 800 may be also applied to alternative embodiments, where voltages $V_{be1}$ and $V_{be2}$ are measured sequentially to determine the PTAT voltage $\Delta V_{be}$, and where the internal reference voltage $V_{ref\_int}$ equals to the voltage $V_{be1}$, the bandgap voltage $V_{bg}$, or an alternative reference voltage, such as a supply voltage derived from a second bandgap voltage generator, for example.

Various embodiments presented herein allow for correcting spread, corner, curvature, drift and uniformity errors to obtain temperature sensors with improved accuracy. In some embodiments, the corner and curvature errors are corrected by applying an approximately linear correction in the temperature domain, and the drift and the uniformity errors are corrected using an average temperature of a wafer and a characteristic function of a thermal chuck, as a part of a post-processing algorithm performed by a post-processing system coupled to a temperature sensor. Various embodiments further allow for an on-chip calibration reference voltage generation, a dedicated test hook-up for DC measurement of the calibration reference voltage, a spatial averaging of data from a plurality of temperature sensors to minimize statistical spread, an on-chip non-volatile memory to store various calibration coefficients and post-processing parameters for use by the post-processing system, and a communication interface coupled between a temperature sensor and a post-processing system for triggering various steps during calibration and for reading various calibration coefficients and post-processing parameters stored in the on-chip non-volatile memory.

Embodiments of the present invention are summarized here. Other embodiments can also be understood form the entirety of the specification and the claims filed herein. One general aspect includes a method including: post processing a plurality of temperature sensors grouped into a plurality of sets, for each set of the plurality of sets: receiving, by a post-processing system coupled to corresponding temperature sensors, a plurality output signals generated by the corresponding temperature sensors; computing, by the post-processing system, values representing proportional to absolute temperature (PTAT) voltages and values representing internal reference voltages based on output signals generated by the corresponding temperature sensors; computing, by the post-processing system, an average of the values representing the PTAT voltages and relative PTAT voltage variation coefficients; and computing, by the post-processing system, values representing corrected PTAT voltages using the relative PTAT voltage variation coefficients.

Implementations may include one or more of the following features. The method where each set of the plurality of sets includes a same number of temperature sensors. The method further including, for each set of the plurality of sets, computing, by the post-processing system, corner correction coefficients and curvature correction coefficients for the corresponding temperature sensors. The method where computing the corner correction coefficients includes: computing, by the post-processing system, values representing the internal reference voltages at a reference temperature; and computing, by the post-processing system, differences between the values representing the internal reference voltages at the reference temperature and a value representing a target internal reference voltage. The method where computing the curvature correction coefficients includes computing, by the post-processing system, values representing shifted bandgap reference voltages based on the values representing the internal reference voltages and the values representing the PTAT voltages, the values representing the shifted bandgap reference voltages having approximately linear temperature dependences within a target temperature range of the plurality of temperature sensors. The method further including, for each set of the plurality of sets, calibrating analog-to-digital converters (ADCs) of the corresponding temperature sensors to obtain gain coefficients. The method further including, for each set of the plurality of sets, computing, by the post-processing system, corrected gain coefficients using the relative PTAT voltage variation coefficients. The method further including, for each set of the plurality of sets, storing the corrected gain coefficients in non-volatile memories of the corresponding temperature sensors. The method further including, for each set of the plurality of sets, storing the values representing corresponding corrected PTAT voltages and the value representing corresponding internal reference voltages in non-volatile memories of the corresponding temperature sensors. The method further including, for each set of the plurality of sets, storing the corner correction coefficients and the curvature correction coefficients in the non-volatile memories of the corresponding temperature sensors. The method further including storing post-processing parameters in the non-volatile memories of the corresponding temperature sensors. The method further including, for each set of the plurality of sets: generating, by the corresponding temperature sensors, first output signals of the plurality of output signals, the first output signals being based on the PTAT voltages and the internal reference voltages generated by temperature sensing circuits of the corresponding temperature sensors; and generating, by the corresponding temperature sensors, second output signals of the plurality of output signals, the second output signals being based on the PTAT voltages generated by the temperature sensing circuits of the corresponding temperature sensors and calibration reference voltages generated by reference voltage generators of the corresponding temperature sensors. The method further including, for each set of the plurality of sets, measuring the value representing the calibration reference voltages. The method further including setting a temperature of the plurality of temperature sensors to a calibration temperature using a thermal chuck. The method further including, for each set of the plurality of sets, computing, by the post-processing system, an average sensed calibration temperature for the corresponding temperature sensors. The method where the calibration temperature is non-uniform across the thermal chuck. The method where a uniformity error of the thermal chuck is characterized by a characteristic function. The method further including narrowing a distribution of average sensed calibration temperatures of the plurality of sets using the characteristic function. The method further including centering the distribution of the average sensed calibration temperatures of the plurality of sets.

A further general aspect includes a method including: receiving, by a post-processing system coupled to a temperature sensor, an output signal generated by the temperature sensor, the output signal being based on a proportional to absolute temperature (PTAT) voltage and an internal reference voltage generated by a temperature sensing circuit of the temperature sensor; reading, by the post-processing system, device specific calibration coefficients and post-processing parameters stored in a non-volatile memory of the temperature sensor; computing, by the post-processing system, a corner correction coefficient and a curvature correction coefficient based on the device specific calibration coefficients; computing, by the post-processing system, a PTAT ratio based on the output signal; and computing, by the post-processing system, a sensed temperature based on the PTAT ratio, the corner correction coefficient and the curvature correction coefficient.

Implementations may include one or more of the following features. The method where computing the sensed temperature includes: computing, by the post-processing system, an estimated temperature based on the PTAT ratio; and correcting, by the post-processing system, the estimated temperature by adding a linear correction term to the estimated temperature to obtain the sensed temperature, the linear correction term being proportional to a sum of the corner correction coefficient and the curvature correction coefficient. The method where computing the sensed temperature includes: correcting, by the post-processing system, mapping coefficients used for mapping the PTAT ratio to a temperature domain using the corner correction coefficient and the curvature correction coefficient to obtain corrected mapping coefficients; and computing, by the post-processing system, the sensed temperature based on the PTAT ratio and the corrected mapping coefficients. The method further including: calibrating the temperature sensor to determine the device specific calibration coefficients; and storing the device specific calibration coefficients in the non-volatile memory. The method further including storing the post-processing parameters in the non-volatile memory. The method where calibrating the temperature sensor includes: setting a temperature of a plurality of temperature sensors to a calibration temperature, the temperature sensor being one of the plurality of temperature sensors; computing, by the post-processing system, values representing PTAT voltages and values representing internal reference voltages of the plurality of temperature sensors; and computing, by the post-processing system, an average of the values representing the PTAT voltages of the plurality of temperature sensors and relative PTAT voltage variation coefficients of the plurality of temperature sensors. The method where computing the corner correction coefficient includes: computing, by the post-processing system, a value representing an internal reference voltage of the temperature sensor at a reference temperature, the reference temperature being different from a calibration temperature; and computing, by the post-processing system, a difference between the value representing the internal reference voltage of the temperature sensor at the reference temperature and a value representing a target internal reference voltage. The method where computing the curvature correction coefficient includes computing, by the post-processing system, a value representing a shifted bandgap reference voltage of the temperature sensor based on the value representing the internal reference voltage of the temperature sensor and the value representing the PTAT voltage of the temperature sensor, the value representing the shifted bandgap reference voltage having an approximately linear temperature dependence within a target temperature range of the temperature sensor.

A further general aspect includes a system including: a temperature sensor; and a post-processing system coupled to the temperature sensor, where the post-processing system is configured to: receive a first signal and a second signal generated by the temperature sensor, the first signal being different from the second signal; determine, using the first signal and the second signal, a corner correction coefficient to correct for a corner error; determine a curvature correction coefficient to correct for a curvature error; and determine a sensed temperature using the corner correction coefficient and the curvature correction coefficient.

Implementations may include one or more of the following features. The system where the post-processing system is further configured to determine, using the first signal and the second signal, device specific calibration coefficients. The system where the temperature sensor further includes a non-volatile memory configured to store the device specific calibration coefficients and post-processing parameters. The system where the temperature sensor includes: a temperature sensing circuit; an analog-to-digital converter (ADC) coupled to the temperature sensing circuit; and a reference voltage generator coupled to the ADC. The system where the temperature sensing circuit is configured to generate a proportional to absolute temperature (PTAT) voltage and an internal reference voltage. The system where the temperature sensing circuit includes at least one diode. The system where the at least one diode is a diode-connected bipolar transistor. The system where the internal reference voltage is a base-emitter voltage of the diode-connected bipolar transistor. The system where the PTAT voltage is a difference between base-emitter voltages of the diode-connected bipolar transistor at different bias currents. The system where the reference voltage generator is configured to generate a calibration reference voltage. The system where the ADC is configured to: generate the first signal based on the PTAT voltage and the internal reference voltage; and generate the second signal based on the PTAT voltage and the calibration reference voltage. The system where the post-processing system is further configured to: determine a value representing the PTAT voltage based on the second signal; determine a relative PTAT voltage variation coefficient to correct for a spread error; and correct the value representing the PTAT voltage using relative PTAT voltage variation coefficient. The system where the temperature sensor further includes a decimation filter coupled between the ADC and the post-processing system. The system where the decimation filter is configured to determine the sensed temperature using the corner correction coefficient and the curvature correction coefficient.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, a determining unit/module, a reading unit/module, a storing unit/module, a computing unit/module, a comparing unit/module, a correcting unit/module, and/or a setting unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
post processing a plurality of temperature sensors grouped into a plurality of sets, for each set of the plurality of sets:
receiving, by a post-processing system coupled to corresponding temperature sensors, a plurality of output signals generated by the corresponding temperature sensors;
reading post-processing parameters stored in non-volatile memories of the corresponding temperature sensors;
computing, by the post-processing system, values representing proportional to absolute temperature (PTAT) voltages and values representing internal reference voltages based on the plurality of output signals generated by the corresponding temperature sensors;
computing, by the post-processing system, an average of the values representing the PTAT voltages and relative PTAT voltage variation coefficients;
computing, by the post-processing system, values representing corrected PTAT voltages using the relative PTAT voltage variation coefficients;
computing, by the post-processing system, corner correction coefficients and curvature correction coefficients for the corresponding temperature sensors; sensors based on the post-processing parameters;
computing, by the post-processing system, estimated temperatures of the corresponding temperature sensors based on the values representing the PTAT voltages; and
correcting, by the post-processing system, the estimated temperatures of the corresponding temperature sensors by adding linear correction terms to the estimated temperatures to obtain the sensed temperatures of the corresponding temperature sensors, the linear correction terms being proportional to sums of the corner correction coefficients and the curvature correction coefficients.

2. The method of claim 1, wherein computing the corner correction coefficients comprises:
computing, by the post-processing system, values representing the internal reference voltages at a reference temperature; and
computing, by the post-processing system, differences between the values representing the internal reference voltages at the reference temperature and a value representing a target internal reference voltage.

3. The method of claim 1, wherein computing the curvature correction coefficients comprises computing, by the post-processing system, values representing shifted bandgap reference voltages based on the values representing the internal reference voltages and the values representing the PTAT voltages, the values representing the shifted bandgap reference voltages having approximately linear temperature dependences within a target temperature range of the plurality of temperature sensors.

4. The method of claim 1, further comprising, for each set of the plurality of sets, calibrating analog-to-digital converters (ADCs) of the corresponding temperature sensors to obtain gain coefficients.

5. The method of claim 4, further comprising, for each set of the plurality of sets, computing, by the post-processing system, corrected gain coefficients using the relative PTAT voltage variation coefficients.

6. The method of claim 4, further comprising, for each set of the plurality of sets, storing the corrected gain coefficients in non-volatile memories of the corresponding temperature sensors.

7. The method of claim 6, further comprising, for each set of the plurality of sets, storing the values representing corresponding corrected PTAT voltages and the value representing corresponding internal reference voltages in non-volatile memories of the corresponding temperature sensors.

8. The method of claim 7, further comprising, for each set of the plurality of sets, storing the corner correction coefficients and the curvature correction coefficients in the non-volatile memories of the corresponding temperature sensors.

9. The method of claim 1, further comprising, for each set of the plurality of sets:
generating, by the corresponding temperature sensors, first output signals of the plurality of output signals, the first output signals being based on the PTAT voltages and the internal reference voltages generated by temperature sensing circuits of the corresponding temperature sensors; and
generating, by the corresponding temperature sensors, second output signals of the plurality of output signals, the second output signals being based on the PTAT voltages generated by the temperature sensing circuits of the corresponding temperature sensors and calibration reference voltages generated by reference voltage generators of the corresponding temperature sensors.

10. The method of claim 1, further comprising setting a temperature of the plurality of temperature sensors to a calibration temperature using a thermal chuck.

11. The method of claim 10, further comprising, for each set of the plurality of sets, computing, by the post-processing system, an average sensed calibration temperature for the corresponding temperature sensors.

12. The method of claim 11, wherein the calibration temperature is non-uniform across the thermal chuck, and wherein a uniformity error of the thermal chuck is characterized by a characteristic function.

13. The method of claim 12, further comprising narrowing a distribution of average sensed calibration temperatures of the plurality of sets using the characteristic function.

14. The method of claim 13, further comprising centering the distribution of the average sensed calibration temperatures of the plurality of sets.

15. A method comprising:
receiving, by a post-processing system coupled to a temperature sensor, an output signal generated by the temperature sensor, the output signal being based on a proportional to absolute temperature (PTAT) voltage and an internal reference voltage generated by a temperature sensing circuit of the temperature sensor;
reading, by the post-processing system, device specific calibration coefficients and post-processing parameters stored in a non-volatile memory of the temperature sensor;

computing, by the post-processing system, a corner correction coefficient and a curvature correction coefficient based on the device specific calibration coefficients;

computing, by the post-processing system, a PTAT ratio based on the output signal; and computing, by the post-processing system, a sensed temperature based on the PTAT ratio, the corner correction coefficient and the curvature correction coefficient.

16. The method of claim 15, wherein computing the sensed temperature comprises:

computing, by the post-processing system, an estimated temperature based on the PTAT ratio; and correcting, by the post-processing system, the estimated temperature by adding a linear correction term to the estimated temperature to obtain the sensed temperature, the linear correction term being proportional to a sum of the corner correction coefficient and the curvature correction coefficient.

17. The method of claim 15, wherein computing the sensed temperature comprises:

correcting, by the post-processing system, mapping coefficients used for mapping the PTAT ratio to a temperature domain using the corner correction coefficient and the curvature correction coefficient to obtain corrected mapping coefficients; and computing, by the post-processing system, the sensed temperature based on the PTAT ratio and the corrected mapping coefficients.

18. The method of claim 15, further comprising:

calibrating the temperature sensor to determine the device specific calibration coefficients; and storing the device specific calibration coefficients in the non-volatile memory.

19. The method of claim 18, further comprising storing the post-processing parameters in the non-volatile memory.

20. The method of claim 18, wherein calibrating the temperature sensor comprises:

setting a temperature of a plurality of temperature sensors to a calibration temperature, the temperature sensor being one of the plurality of temperature sensors;

computing, by the post-processing system, values representing PTAT voltages and values representing internal reference voltages of the plurality of temperature sensors; and computing, by the post-processing system, an average of the values representing the PTAT voltages of the plurality of temperature sensors and relative PTAT voltage variation coefficients of the plurality of temperature sensors.

21. The method of claim 15, wherein computing the corner correction coefficient comprises:

computing, by the post-processing system, a value representing an internal reference voltage of the temperature sensor at a reference temperature, the reference temperature being different from a calibration temperature; and computing, by the post-processing system, a difference between the value representing the internal reference voltage of the temperature sensor at the reference temperature and a value representing a target internal reference voltage.

22. The method of claim 15, wherein computing the curvature correction coefficient comprises computing, by the post-processing system, a value representing a shifted bandgap reference voltage of the temperature sensor based on the value representing the internal reference voltage of the temperature sensor and the value representing the PTAT voltage of the temperature sensor, the value representing the shifted bandgap reference voltage having an approximately linear temperature dependence within a target temperature range of the temperature sensor.

23. A system comprising:

a temperature sensor, wherein the temperature sensor comprises a non-volatile memory configured to store device specific calibration coefficients and post-processing Parameters; and a post-processing system coupled to the temperature sensor, wherein the post-processing system is configured to:

receive a first signal and a second signal generated by the temperature sensor, the first signal being proportional to a ratio of a proportional to absolute temperature (PTAT) voltage to an internal reference voltage, the second signal being proportional to a ratio of the PTAT voltage to a calibration reference voltage;

read the device specific calibration coefficients and the post-processing parameters stored in the non-volatile memory of the temperature sensor;

determine, using the post-processing parameters and the device specific calibration coefficients, a corner correction coefficient to correct for a corner error;

determine, using the post-processing parameters and the device specific calibration coefficients, a curvature correction coefficient to correct for a curvature error;

determine, using the first signal, a PTAT ratio, the PTAT ratio being proportional to a ratio of the PTAT voltage to a bandgap reference voltage, the bandgap reference voltage being equal to a linear combination of the PTAT voltage and the internal reference voltage;

determine, using the PTAT ratio, an estimated temperature; and correct the estimated temperature by adding a linear correction term to the estimated temperature to determine a sensed temperature, the linear correction term being proportional to a sum of the corner correction coefficient and the curvature correction coefficient.

24. The system of claim 23, wherein the post-processing system is further configured to determine, using the first signal and the second signal, the device specific calibration coefficients.

25. The system of claim 23, wherein the temperature sensor further comprises:

a temperature sensing circuit;

an analog-to-digital converter (ADC) coupled to the temperature sensing circuit; and a reference voltage generator coupled to the ADC.

26. The system of claim 25, wherein the temperature sensing circuit is configured to generate the PTAT voltage and the internal reference voltage.

27. The system of claim 26, wherein the reference voltage generator is configured to generate the calibration reference voltage.

28. The system of claim 27, wherein the ADC is configured to:

generate the first signal based on the PTAT voltage and the internal reference voltage; and generate the second signal based on the PTAT voltage and the calibration reference voltage.

29. The system of claim 28, wherein the post-processing system is further configured to:

determine a value representing the PTAT voltage based on the second signal;

determine a relative PTAT voltage variation coefficient to correct for a spread error; and correct the value representing the PTAT voltage using relative PTAT voltage variation coefficient.

30. The system of claim 25, wherein the temperature sensor further comprises a decimation filter coupled between the ADC and the post-processing system.

31. The system of claim 30, wherein the decimation filter is configured to determine the sensed temperature using the corner correction coefficient and the curvature correction coefficient.

32. The method of claim 13, wherein narrowing the distribution of the average sensed calibration temperatures of the plurality of sets using the characteristic function comprises subtracting the characteristic function from the average sensed calibration temperatures.

33. The system of claim 25, wherein the temperature sensor further comprises a switch coupled to the reference voltage generator.

34. The system of claim 30, wherein the temperature sensor further comprises an interface coupling the decimation filter and the non-volatile memory to the post-processing system.

* * * * *

UNITED STATES PATENT AND TRADEMARK OFFICE
CERTIFICATE OF CORRECTION

PATENT NO. : 10,228,294 B2
APPLICATION NO. : 15/153577
DATED : March 12, 2019
INVENTOR(S) : Elmar Bach et al.

It is certified that error appears in the above-identified patent and that said Letters Patent is hereby corrected as shown below:

In the Claims

In Column 19, Line 39, Claim 1, delete "sensors;".

In Column 22, Line 9, Claim 23, delete "Parameters" and insert --parameters--.

Signed and Sealed this
Third Day of September, 2019

Andrei Iancu
*Director of the United States Patent and Trademark Office*